(12) United States Patent
Seifert et al.

(10) Patent No.: US 11,585,400 B2
(45) Date of Patent: Feb. 21, 2023

(54) LIQUID INERTIA VIBRATION ELIMINATION SYSTEM

(71) Applicant: Textron Innovations Inc., Providence, RI (US)

(72) Inventors: Michael Scott Seifert, Southlake, TX (US); Frederick Sullivan Gay, Fort Worth, TX (US); Dalton T. Hampton, Fort Worth, TX (US); Frank Bradley Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 16/782,019

(22) Filed: Feb. 4, 2020

(65) Prior Publication Data

US 2020/0173512 A1 Jun. 4, 2020

Related U.S. Application Data

(62) Division of application No. 15/240,797, filed on Aug. 18, 2016, now Pat. No. 10,550,907.

(51) Int. Cl.
| | |
|---|---|
| *F16F 7/10* | (2006.01) |
| *B64C 27/00* | (2006.01) |
| *B64D 35/00* | (2006.01) |

(52) U.S. Cl.
CPC .......... *F16F 7/1034* (2013.01); *B64C 27/001* (2013.01); *B64D 35/00* (2013.01); *B64C 2027/002* (2013.01)

(58) Field of Classification Search
CPC ........ B64C 2027/002; B64C 2027/004; B64C 2027/001; B64C 27/00; B64D 35/00; F16F 7/1034
See application file for complete search history.

(56) References Cited

U.S. PATENT DOCUMENTS

| | | | | |
|---|---|---|---|---|
| 2,766,079 A | * | 10/1956 | Browne | F16C 11/0614 384/209 |
| 2,774,553 A | | 12/1956 | Jensen | |
| 3,690,607 A | * | 9/1972 | Mard | B64C 27/001 248/550 |
| 4,236,607 A | * | 12/1980 | Halwes | B64C 27/001 188/379 |
| 4,440,186 A | * | 4/1984 | Lottner | A45B 9/04 135/84 |
| 4,811,919 A | | 3/1989 | Jones | |
| 5,762,295 A | | 6/1998 | McGuire et al. | |
| 5,788,372 A | * | 8/1998 | Jones | B64D 27/26 137/513.3 |
| 6,431,530 B1 | * | 8/2002 | Stamps | F16F 1/38 267/136 |
| 6,454,206 B2 | | 9/2002 | Vincent | |
| 6,926,500 B2 | | 8/2005 | Ferullo | |
| 8,328,129 B2 | * | 12/2012 | Smith | F16F 15/02 244/17.27 |
| 8,499,907 B2 | * | 8/2013 | Smith | F16F 13/26 188/378 |
| 9,297,439 B2 | | 3/2016 | Smith et al. | |

(Continued)

*Primary Examiner* — Christopher D Hutchens
(74) *Attorney, Agent, or Firm* — Lightfoot & Alford PLLC

(57) ABSTRACT

An aircraft, has an airframe, a transmission, and a liquid inertia vibration elimination (LIVE) system disposed between the airframe and the transmission via spherical bearings of two legs and via a central spherical bearing.

11 Claims, 13 Drawing Sheets

(56) References Cited

U.S. PATENT DOCUMENTS

| | | | |
|---|---|---|---|
| 2002/0060268 A1* | 5/2002 | Smith | F16F 15/027 |
| | | | 244/54 |
| 2004/0084818 A1* | 5/2004 | Russell | B64C 27/35 |
| | | | 267/140.11 |
| 2011/0316207 A1* | 12/2011 | Smith | B64C 27/001 |
| | | | 267/140.15 |
| 2013/0175389 A1* | 7/2013 | Griffin | F16F 13/24 |
| | | | 244/54 |
| 2014/0369783 A1 | 12/2014 | Sandy | |
| 2015/0139575 A1* | 5/2015 | Romano | B64C 27/001 |
| | | | 384/125 |

\* cited by examiner

LIQUID INERTIA VIBRATION ELIMINATION SYSTEM

CROSS-REFERENCE TO RELATED APPLICATIONS

This is a divisional application of application Ser. No. 15/240,797, which was filed on 18 Aug. 2016 and entitled "LIQUID INERTIA VIBRATION ELIMINATION SYSTEM."

BACKGROUND

Technical Field

The present disclosure relates in general to vibration control. More specifically, the present disclosure relates to an apparatus for isolating mechanical vibrations in structures or bodies that are subject to harmonic or oscillating displacements or forces. The apparatus of the present disclosure is well suited for use in the field of aircraft, in particular, helicopters and other rotary wing aircraft.

Description of Related Art

For many years, effort has been directed toward the design of an apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + ks$$

A vibration isolator utilizes inertial forces ($m\ddot{x}$) to cancel elastic forces (kx). On the other hand, a damping device is concerned with utilizing dissipative effects ($c\dot{x}$) to remove energy from a vibrating system.

One important engineering objective during the design of an aircraft vibration-isolation system is to minimize the length, weight, and overall size including cross-section of the isolation device. This is a primary objective of all engineering efforts relating to aircraft. It is especially important in the design and manufacture of helicopters and other rotary wing aircraft, such as tilt rotor aircraft, which are required to hover against the dead weight of the aircraft, and which are, thus, somewhat constrained in their payload in comparison with fixed-wing aircraft.

Another important engineering objective during the design of vibration-isolation systems is the conservation of the engineering resources that have been expended in the design of other aspects of the aircraft or in the vibration-isolation system. In other words, it is an important industry objective to make incremental improvements in the performance of vibration isolation systems which do not require radical re-engineering or complete redesign of all of the components which are present in the existing vibration-isolation systems.

A marked departure in the field of vibration isolation, particularly as applied to aircraft and helicopters is disclosed in U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in U.S. Pat. No. 5,439,082, titled "Hydraulic Inertial Vibration Isolator," issued 8 August 1995, to McKeown, et al. (McKeown '082). McKeown '082 is incorporated herein by reference. An example of the former is found in U.S. Pat. No. 6,022,600, title "High-Temperature Fluid Mounting", issued 8 Feb. 2000, to Schmidt et al. (Schmidt '600).

Several factors affect the performance and characteristics of the Halwes-type isolator, including the density and viscosity of the fluid employed, the relative dimensions of components of the isolator, and the like. One improvement in the design of such isolators is disclosed in U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in U.S. Pat. No. 5,435,531, titled "Vibration Isolation System," issued 25 Jul. 1995, to Smith et al. (Smith '531). In Smith '531, an axially extendable sleeve is used in the inner wall of the tuning passage in order to change the length of the tuning passage, thereby changing the isolation frequency. Another development in the design of tunable Halwes-type isolators was disclosed in U.S. Pat. No. 5,704,596, titled "Vibration Isolation System," issued 6 Jan. 1998, to Smith et al. (Smith '596). In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No.

6,695,106, titled "Method and Apparatus for Improved Vibration Isolation," issued 24 Feb. 2004, to Smith et al, which is hereby incorporated by reference.

Although the foregoing developments represent great strides in the area of vibration isolation, many shortcomings remain.

DETAILED DESCRIPTION

Illustrative embodiments of the embodiments are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
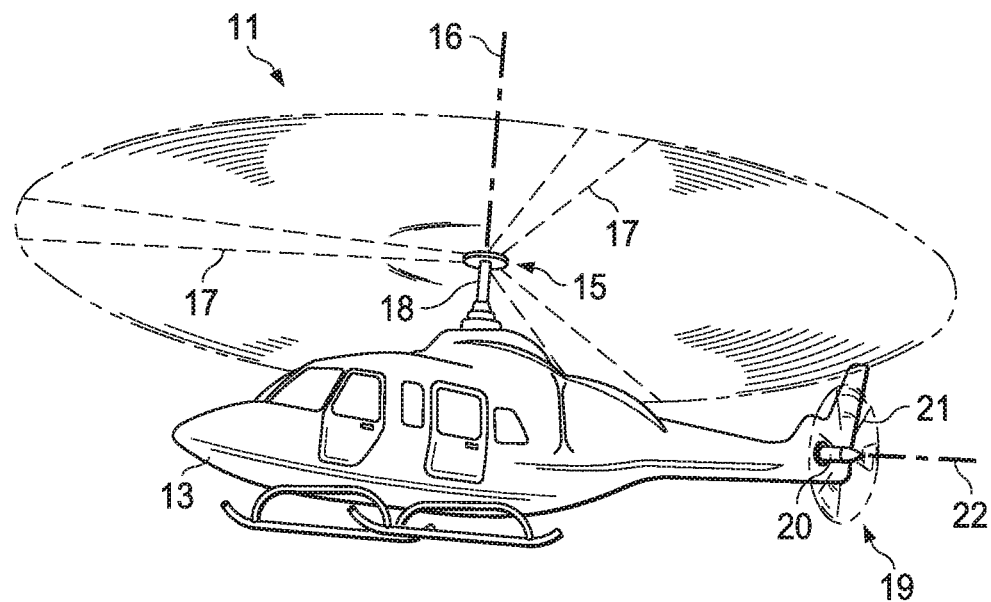
FIG. 1 is a perspective view of a helicopter.

Referring to FIG. 1 in the drawings, a helicopter 11 according to the present disclosure is illustrated. Helicopter 11 can have a fuselage 13 and a main rotor assembly 15, including main rotor blades 17 and a main rotor shaft 18. Helicopter 11 can have a tail rotor assembly 19, including tail rotor blades 21 and a tail rotor shaft 20. Main rotor blades 17 generally rotate about a vertical axis 16 of main rotor shaft 18. Tail rotor blades 21 generally rotate about a lateral axis 22 of tail rotor shaft 20. Helicopter 11 also includes a vibration isolation apparatus according to the present disclosure for isolating fuselage 13 or other portions of helicopter 11 from mechanical vibrations, such as harmonic vibrations, which are associated with the propulsion system and which can arise from the engine, transmission, and rotors of helicopter 11.

Figure 2A:
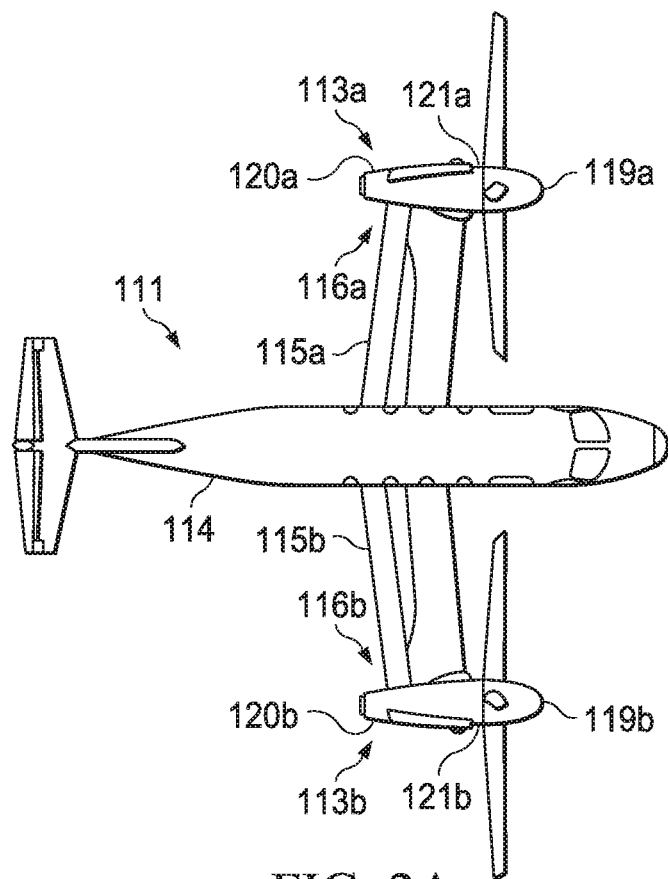
FIG. 2A is a plan view of a tilt rotor aircraft in an airplane mode.
Figure 2B:
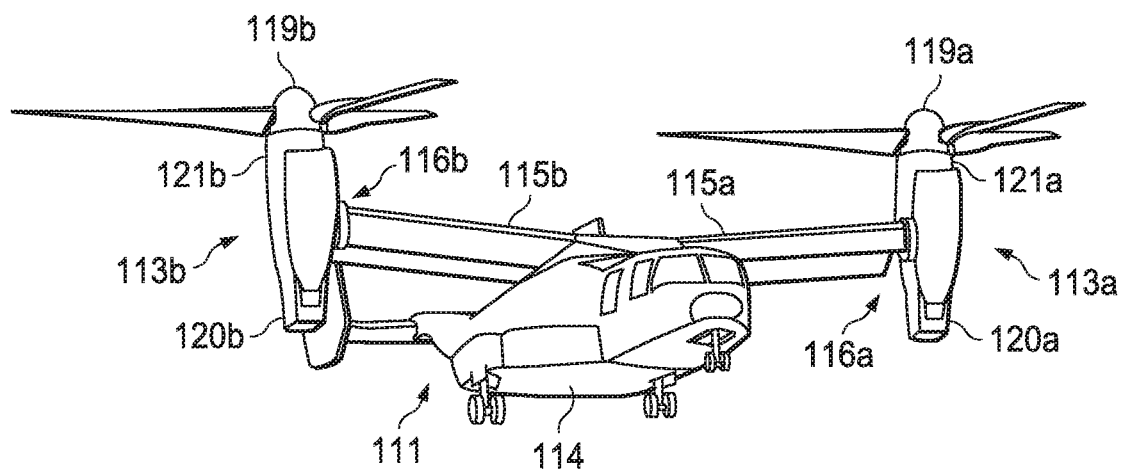
FIG. 2B is a perspective view of a tilt rotor aircraft in a helicopter mode.

The apparatuses of the present disclosure may also be utilized on other types of rotary wing aircraft. Referring now to FIGS. 2A and 2B in the drawings, a tilt rotor aircraft 111 is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 can include a vibration isolation apparatus according to the present disclosure for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
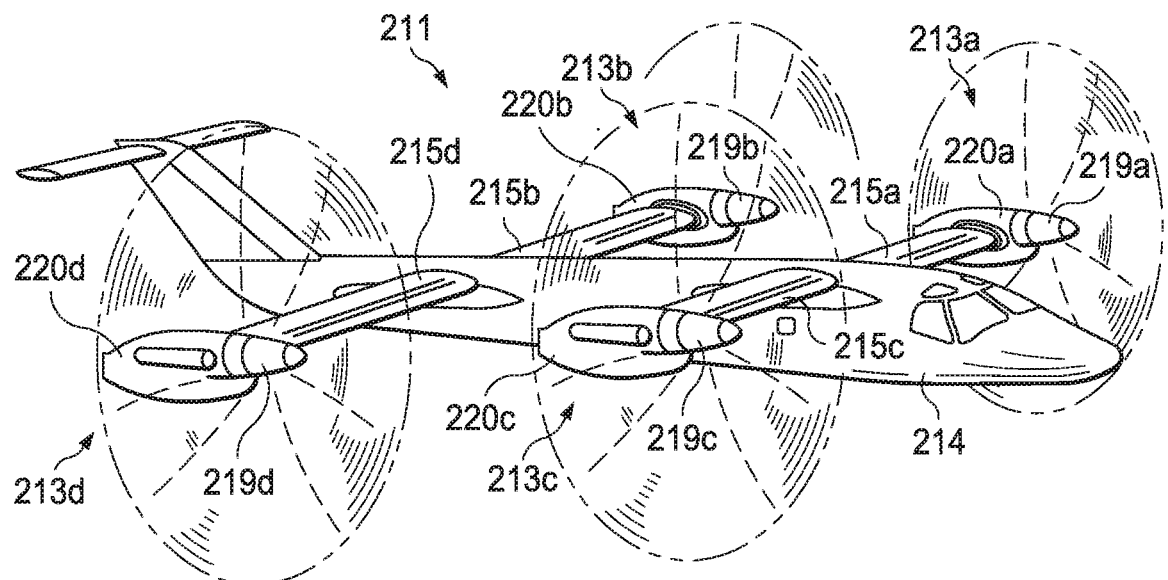
FIG. 3 is a perspective view of a quad tilt rotor aircraft in an airplane mode.

Referring now to FIG. 3 in the drawings, a quad tilt rotor aircraft 211 according to one embodiment of the present disclosure is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 can include a vibration isolation apparatus for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211. It should be understood that the apparatuses of the present disclosure may be used with any aircraft on which it would be desirable to have vibration isolation, including unmanned aerial vehicles that are remotely piloted.

Figure 4:
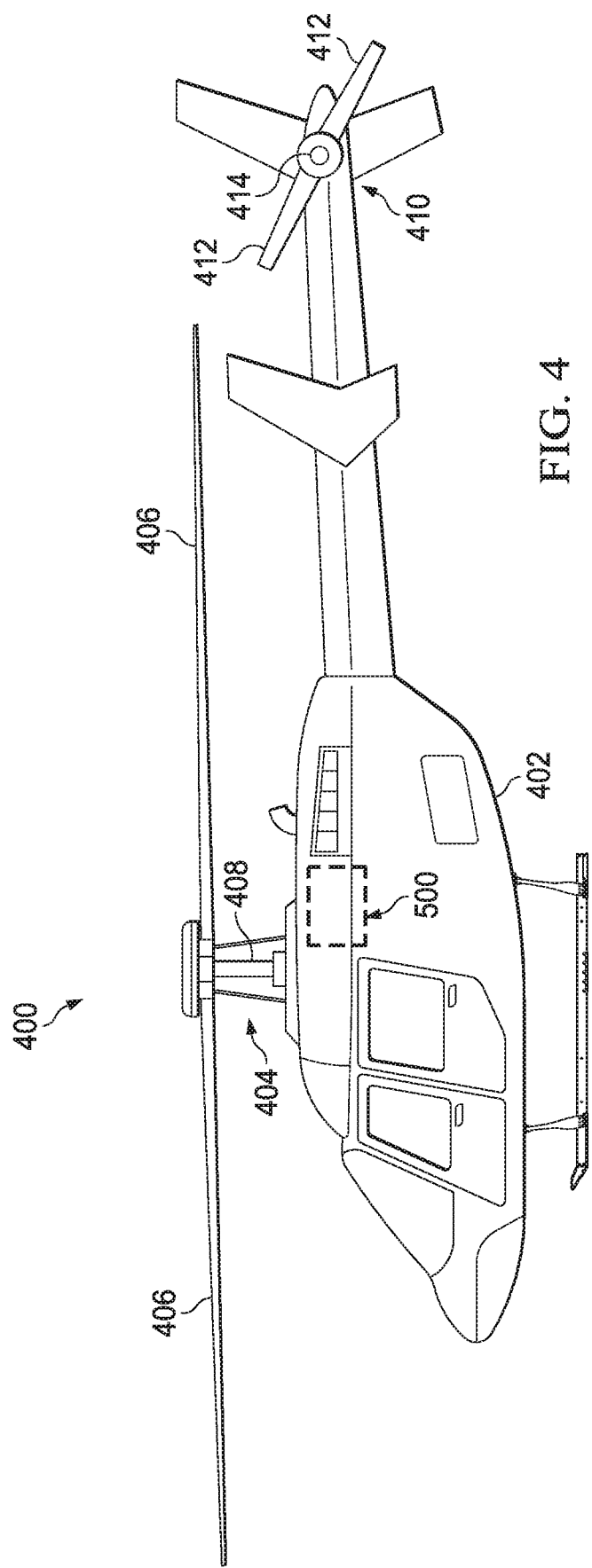
FIG. 4 is a side view of a helicopter comprising two rotor blades and two liquid inertia vibration elimination (LIVE) systems according to an embodiment of the present disclosure.
Figure 5:
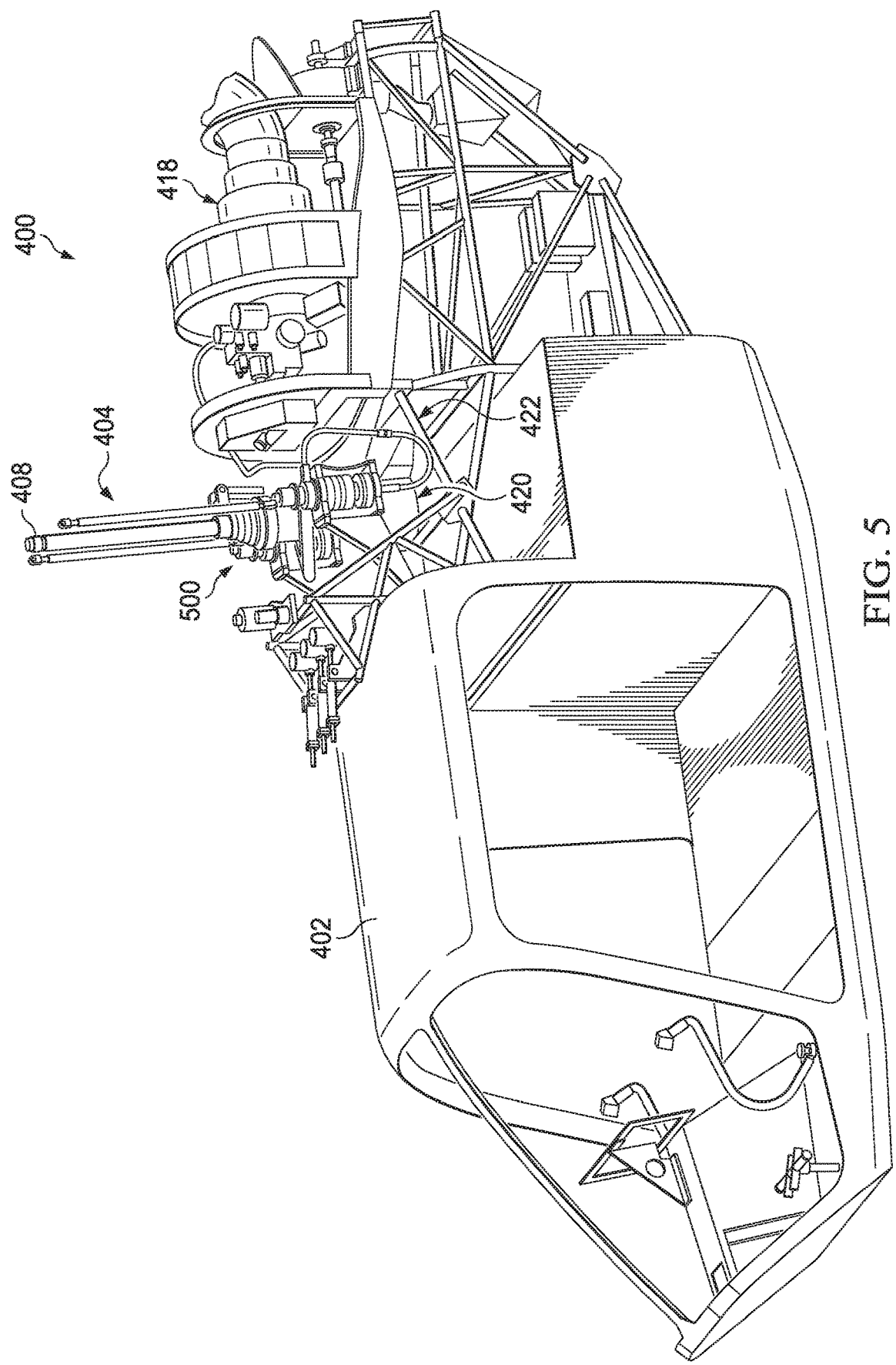
FIG. 5 is an oblique view of a portion of the helicopter of FIG. 4 showing the LIVE systems.

Referring now to FIGS. 4 and 5 in the drawings, a helicopter 400 according to the present disclosure is illustrated. Helicopter 400 comprises a fuselage 402 and a main rotor assembly 404, including main rotor blades 406 and a main rotor shaft 408. Helicopter 400 comprises a tail rotor assembly 410, including tail rotor blades 412 and a tail rotor shaft 414. Main rotor blades 406 generally rotate about a vertical axis of main rotor shaft 408. Tail rotor blades 412 generally rotate about a lateral axis of tail rotor shaft 414. Helicopter 400 further comprises two liquid inertia vibration elimination (LIVE) systems 500 according to the present disclosure for isolating fuselage 402 or other portions of helicopter 400 from mechanical vibrations, such as harmonic vibrations, which are associated with the propulsion system and which can arise from an engine 418, transmission 420, and rotor assemblies 404, 410 of helicopter 400.

Figure 6:
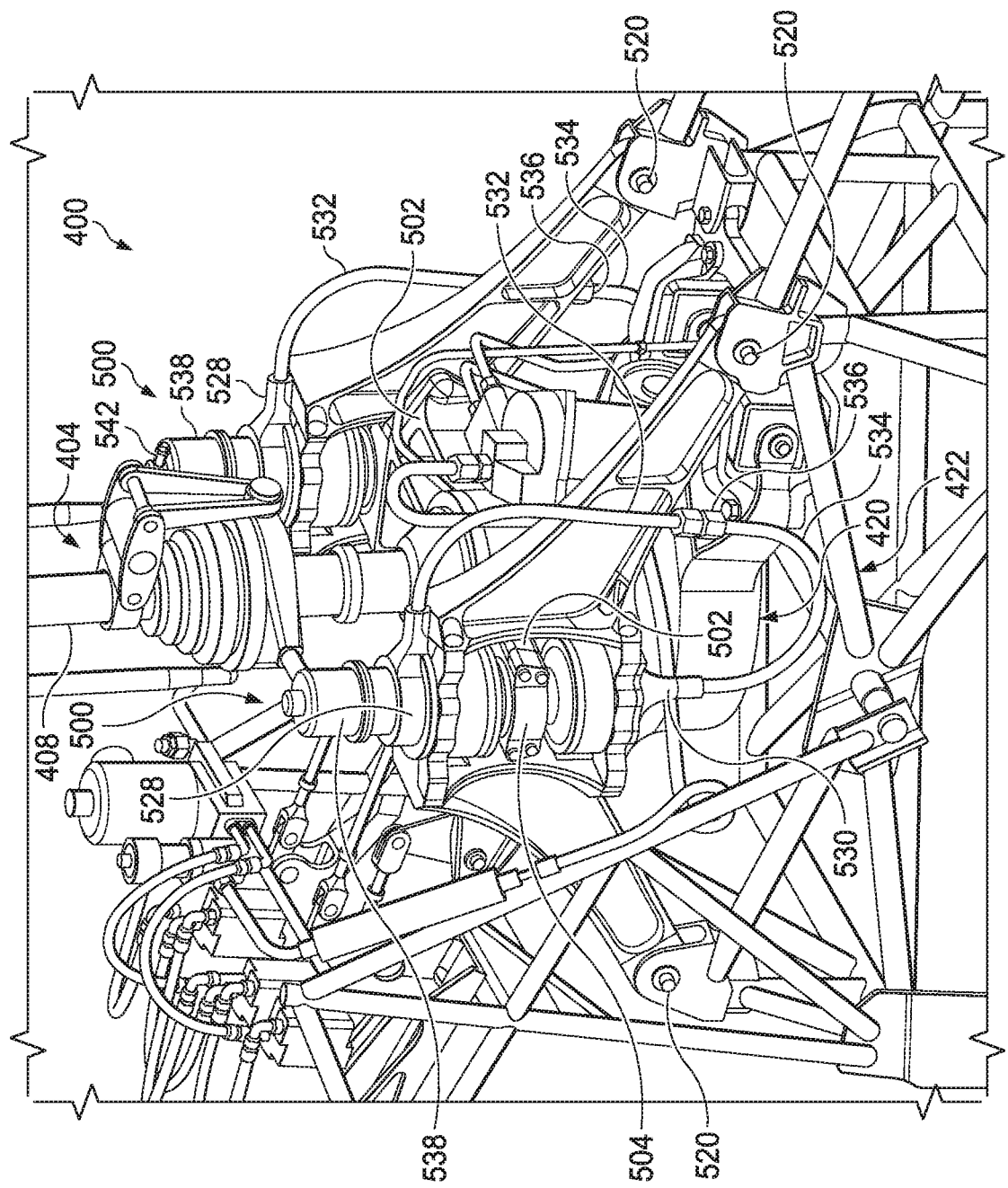
FIG. 6 is an oblique view of a portion of the helicopter of FIG. 4 showing the two LIVE systems in greater detail.
Figure 7:
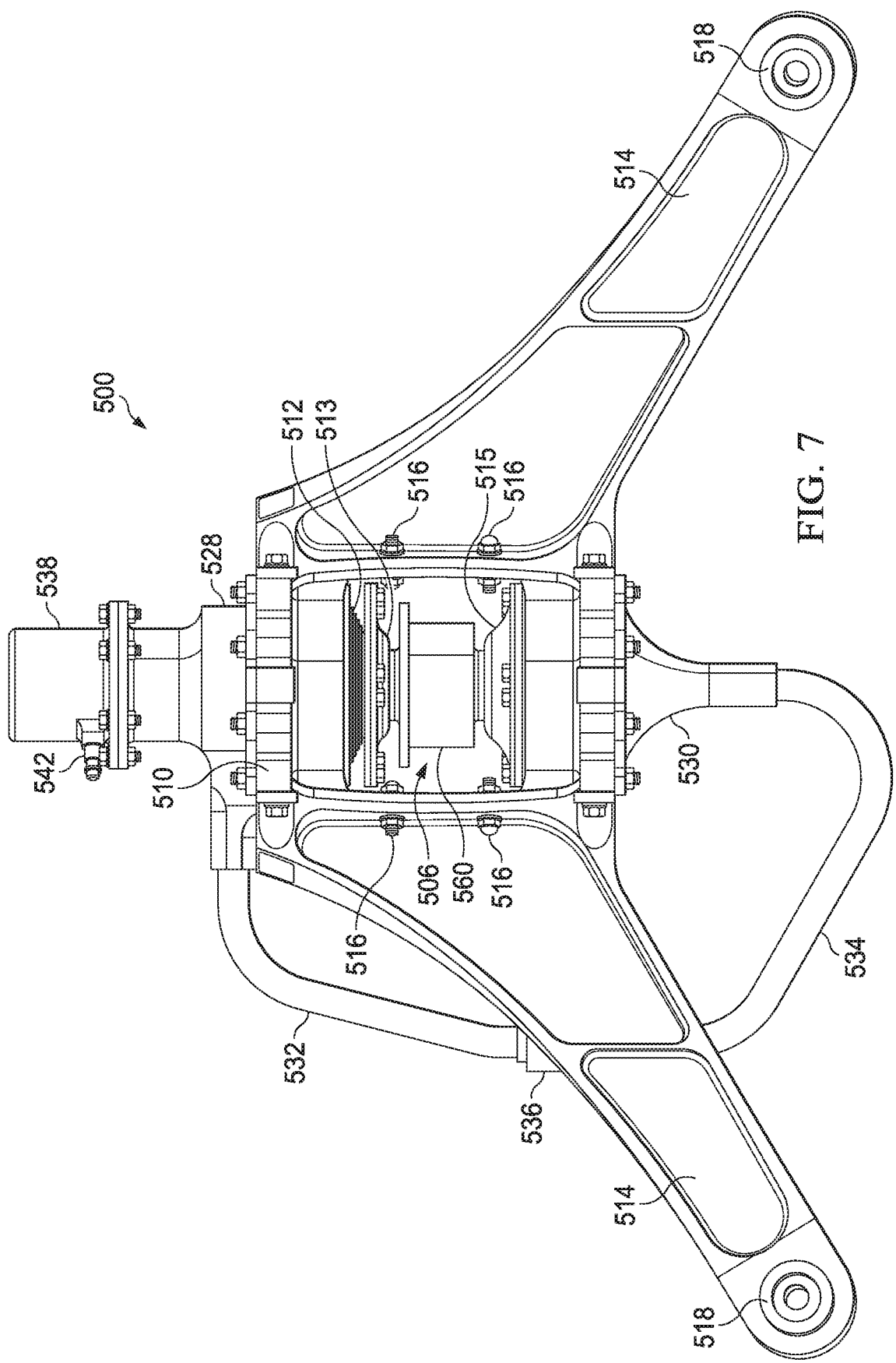
FIG. 7 is a side view of one of the LIVE systems of FIGS. 4-6.
Figure 8:
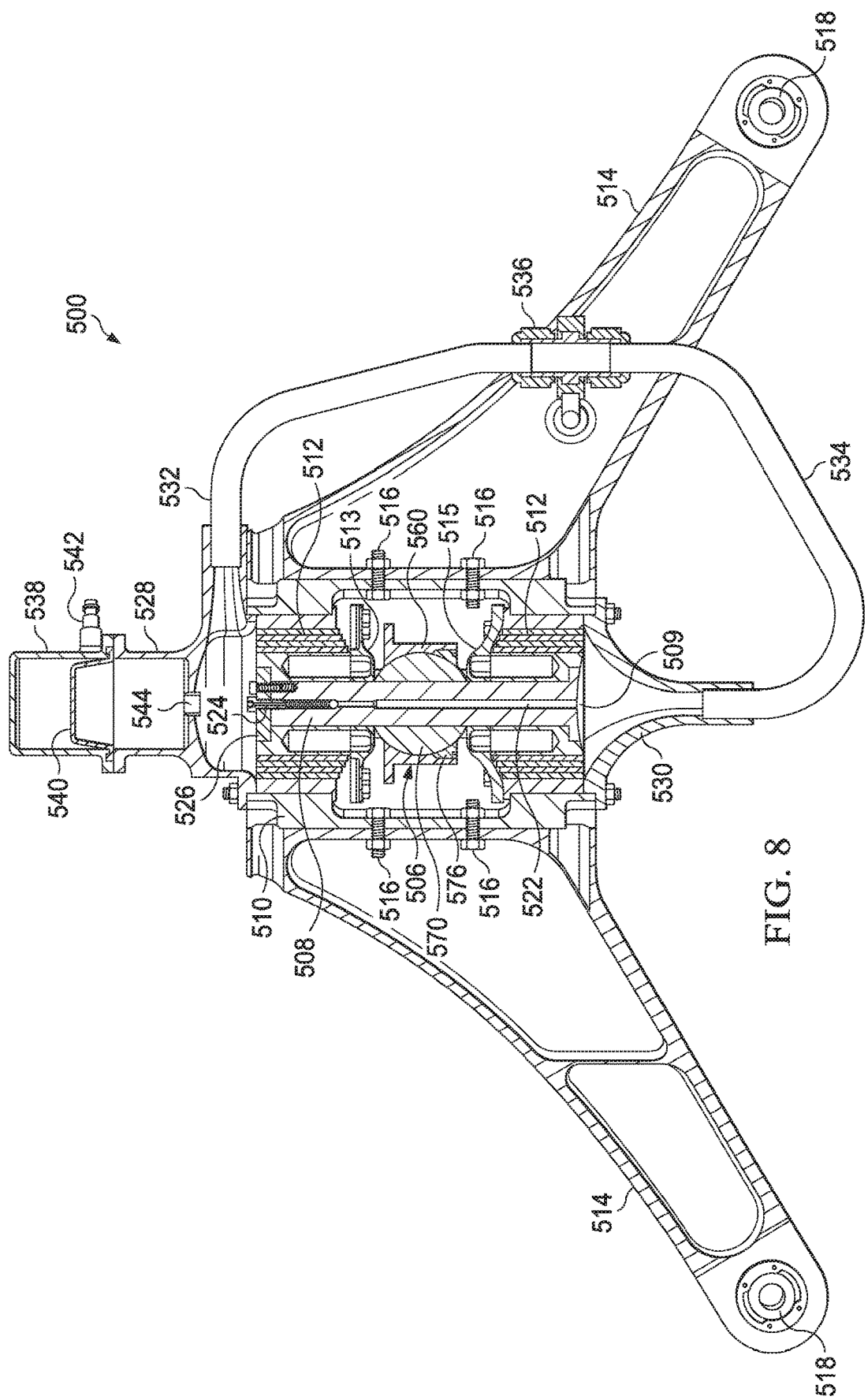
FIG. 8 is a cutaway side view of one of the LIVE systems of FIGS. 4-6.

Referring to FIG. 6-8, the transmission 420 is suspended between the LIVE systems 500 and an internal frame 422, an airframe, of the helicopter 400. More specifically, a bridge beam 502 and a complementary bridge cap 504 of each LIVE system 500 are used to capture and connect a spherical center bearing 506 of the LIVE system 500 to the transmission 420. The spherical center bearing 506 generally receives a spindle 508 through a central passage of the spherical center bearing 506 (see FIG. 8). The LIVE system 500 is further connected to the internal frame 422 using a three piece assembly comprising a central bearing housing 510 configured to receive two journal bearings 512 and two legs 514. The spherical center bearing 506 provides pitch compliance for the transmission while the journal bearings 512 provide vertical compliance. The vertical travel is limited in an upward direction by a shimmable up-stop 513 and limited in a downward direction by a shimmable down-stop 515. In some embodiments, the up-stop 513 can result in a metal on metal contact and may have a gap of 0.325" when the helicopter 400 is at rest on the ground. In some embodiments, the down-stop 515 can also result in a metal on metal contact and the gap may be shimmed to zero in a no load condition. Each of the up-stop 513 and the down-stop 515 comprise a removable and shimmable ring with a rubber face that and the removable rings and rubber faces are all removable and externally accessible.

The legs 514 are attached to the central bearing housing 510 using fasteners 516, which in this embodiment comprise bolts. In some embodiments, the legs 514 and the central bearing housing 510 are constructed of aluminum. The legs 514 are further attached to trusses of the internal frame 422 using spherical truss attachment bearings 518 and pins 520. The legs 514 can transfer thrust and torque loads to the internal frame 422. The spherical truss attachment bearings 518 allow for moment alleviation and dynamic tuning In this embodiment, the LIVE systems 500 are passive systems that comprise a fluid path that extends generally centrally through a central axis of the central bearing housing 510 and along an external path through an assembly of external caps and tubes. More specifically, the LIVE systems 500 comprise a fluid path comprising at least a central bore 522 of the spindle 508, a central bore 524 of a spindle cap 526, interior portions of an upper end cap 528, interior portions of a lower end cap 530, an upper external tube 532, a lower external tube 534, and a tube coupling 536. In this embodiment, the internal central bore 522 of the spindle 508 is considered an auxiliary fluid path between the interior of the upper end cap 528 and the interior of the lower end cap 530. Together, the upper external tube 532, lower external tube 534, and tube coupling 536 form a primary and external fluid flow path between interior of the upper end cap 528 and the interior of the lower end cap 530. In some cases, a length of the external flow path can be changed to tune the LIVE system 500. In some embodiments, the upper external tube 532 and the lower external tube 534 are substantially rigid and self-supporting so that they need not be managed and/or significantly tethered to other structures along their lengths. In this embodiment, the upper external tube 532 is received into a complementary integral fitting of the upper end cap 528 and the lower external tube 534 is received into a complementary integral fitting of the lower end cap 530. In some cases, the tubes 532, 534 may be bonded directly to the caps 528, 530, respectively. Further, the tubes 532, 534 may be bonded to the tube coupling 536. Bonding the tubes 532, 534 can provide relatively lower turbulence transitions as compared to other fluid connection methods. Because the primary port and/or fluid flow path is external, the size and weight of the components necessary to mount the LIVE system 500 can be significantly reduced. The auxiliary fluid path, namely the internal central bore 524 can facilitate filling the LIVE system 500 with fluid and can provide a path for gas otherwise trapped in the interior chamber of the lower end cap 530 to travel to the interior chamber of the upper end cap 528 and subsequently the gas can travel from the upper end cap 528 to the accumulator. Additionally, a lower end of the spindle 508 comprises a concavity 509 that can assist in gathering air trapped below the spindle 508 and guide the air toward internal central bore 524 of the spindle 508. In this embodiment, the accumulator space comprises an upper interior portion of the upper end cap 528 and the interior portion of an accumulator cap 538. In some embodiments, the accumulator functionality of LIVE system 500 may be in fluid connection with other LIVE systems that do not have accumulator functionality.

In some embodiments, the LIVE systems 500 further comprise an accumulator cap 538 connected to the upper end cap 528 and a diaphragm 540 may be disposed within the accumulator cap 538. In some embodiments, the diaphragm comprises a thick elastomeric dam with a solid section in the center and the center can be supported by a coil spring. Further, the elastomeric dam can further comprises a shape profile selected to better direct purging of air, such as a convex or concave shape that funnels air bubbles toward a location in close fluid communication with a bleed port. In some embodiments, the accumulator cap 538 and diaphragm 540 can be sized for operation between −40 and 140 degrees Fahrenheit. The LIVE systems 500 further comprise a valve port 542 that allows selective fluid transmission into and out of the accumulator cap 538. The valve port 542 may be configured to allow management of nitrogen gas within the accumulator cap 538 so that a nominal steady pressure exists at 75 degrees Fahrenheit. In alternative embodiments, the accumulator can utilize other gasses, such as argon, fluorocarbon gasses, and/or other gasses that can reduce gas absorption into the fluid. In alternative embodiments, an accumulator can be provided that attaches to multiple LIVE systems 500 via flexible lines. Still further, a threaded fill port plug 544 may be disposed in a passageway between an upper chamber of the upper end cap 528 and a lower chamber of the upper end cap 528. To allow some fluid transfer between the upper and lower chambers of the upper end cap 528, the threaded fill port plug 544 comprises longitudinal slots cut through the threads. Because the slots cut through the threads are relatively small as compared to the primary and external fluid flow path, the slots provide a flow path to the accumulator while restricting oscillatory flow that might degrade performance. In an alternative embodiment, the threaded fill port plug 544 can be replaced by a one-way flow valve which also allows fluid to reach the accumulator while also preventing oscillatory flow. In some embodiments, the threaded fill port plug 544 is substantially coaxial with the central bore 522 of the spindle 508. In some embodiments, the accumulator cap 538 is removable and when removed provides a large hole for filling the LIVE system 500 with fluid via the threaded fill port plug 544. In some cases, tools may be inserted through the large hole to manipulate components within the LIVE system 500 via the hole present when threaded fill port plug 544 is also removed.

Figure 9:
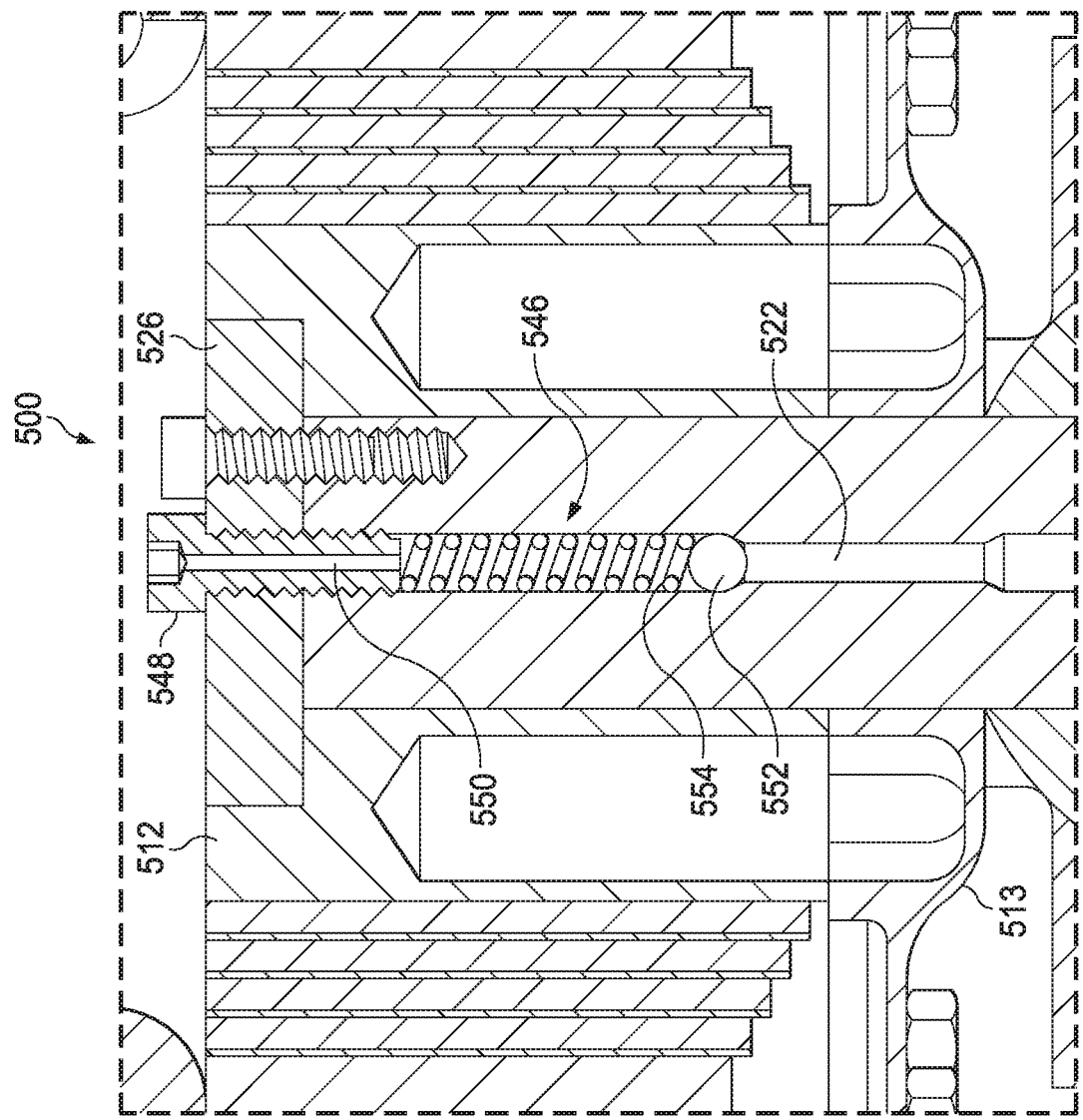
FIG. 9 is a closer view of portion of the cutaway side view of FIG. 8.

Referring now to FIG. 9, a one-way flow valve 546 is integrated into the removable spindle cap 526. In this embodiment, a port screw 548 comprising a central port 550 can allow fluid flow upward again a biased ball 552. In this embodiment, the ball 552 is biased by a spring 554 disposed between the ball 552 and the port screw 548. In some embodiments, ball 552 and/or spring 554 can be temporarily removed to allow filling, bleeding, servicing, refilling, and/or repressurizing the LIVE system 500. Alternatively and/or in addition, a fill port separate fitting may be provided to the LIVE system 500 to allow pushing of fluid up from bottom until fluid starts pumping out. In some cases, the ball 552 and/or spring 554 can be temporarily removed to allow gas bubbles to move more easily.

Figure 10:
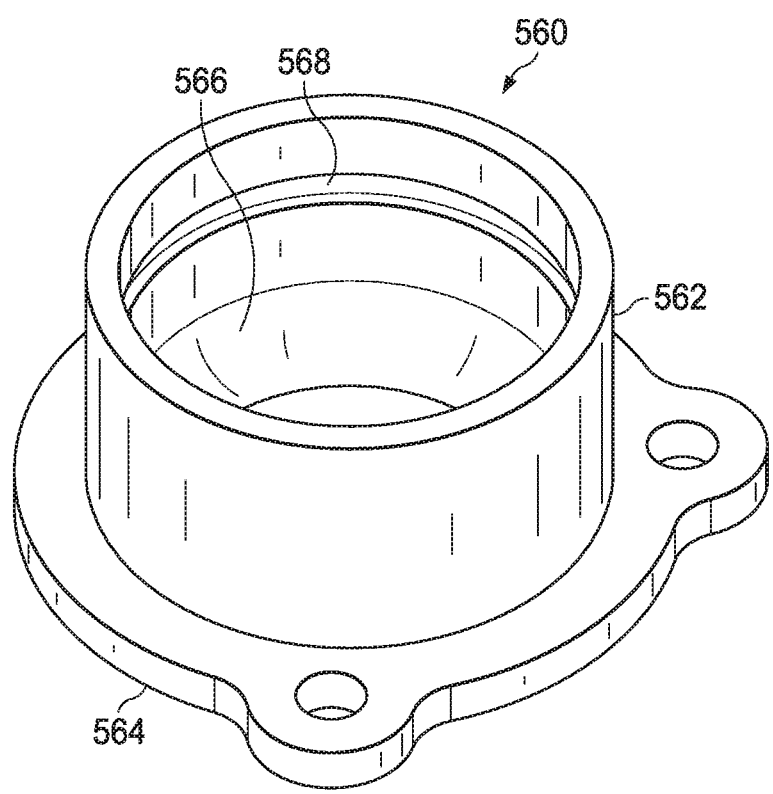
FIG. 10 is an oblique view of a spherical bearing housing of the LIVE systems of FIGS. 4-6.
Figure 11:
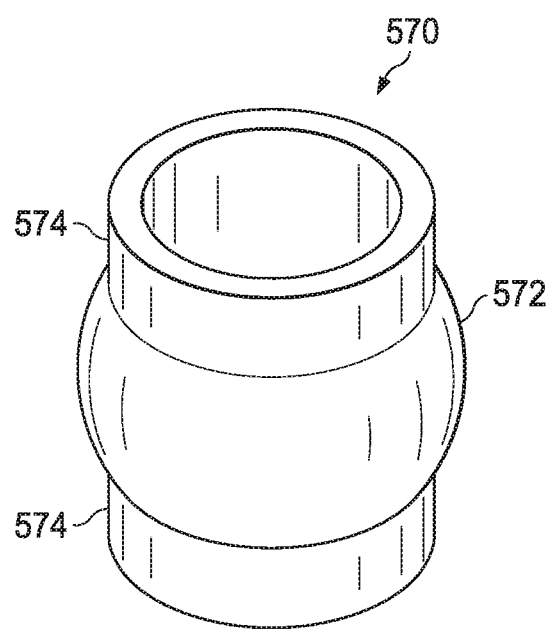
FIG. 11 is an oblique view of a spherical bearing center of the LIVE systems of FIGS. 4-6.
Figure 12:
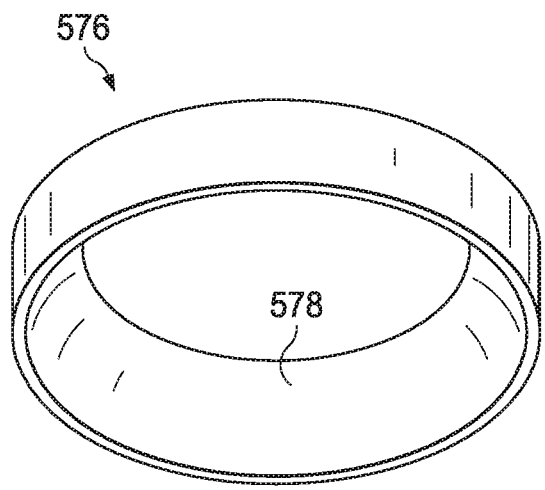
FIG. 12 is an oblique view of a spherical bearing retaining cap of the LIVE systems of FIGS. 4-6.

Referring now to FIG. 10, a spherical bearing housing 560 of the spherical center bearing 506 is shown. The spherical bearing housing 560 generally comprises a tubular wall 562 attached to a flange plate 564. The inner profile of the tubular wall 562 comprises a spherical interface 566 and an interior ledge 568. Referring now to FIG. 11, a spherical bearing center 570 comprises a central spherical portion 572 and upper and lower cylindrical portions 574. Referring now to FIG. 12, a spherical bearing retaining cap 576 is shown. The spherical bearing retaining cap 576 comprises a ring-like structure comprising a spherical interior profile 578. Most generally, the spherical center bearing 506 can be constructed by inserting the spherical bearing center 570 into the spherical bearing housing 560 so that the central spherical portion 572 contacts and/or is offset from the spherical interface 566. Next, the spherical bearing retaining cap 576 can be inserted into the spherical bearing housing 560 until the spherical bearing retaining cap 576 contacts the interior ledge 568 and the central spherical portion 572 contacts and/or is offset from the spherical interior profile 578. In some cases, once the central spherical portion 572 is captured between the spherical bearing housing 560 and the spherical bearing retaining cap 576 as described above, an elastomer can be injected and/or molded around the central spherical portion 572. In some cases, the spherical bearing housing 560 when attached to the bridge beam 502 and bridge cap 504 of the spherical bearing housing 560 using the flange plate 564 allows weight of the fuselage to provide vertical preloading thereby reducing required fastener loads. Additionally, the flange plate 564 allows for easy vertical shimming of the transmission 420, which can aid in driveshaft alignment.

In some embodiments, an adjustable density fluid may be utilized in the internal and external fluid flow paths to facilitate dynamic tuning of the LIVE system 500. Further, while the embodiment shown is a passive system, in alternative embodiments, an active pumping mechanism (such as a piezo electric based pump) may be utilized to improve vibration isolation performance for a variety of transmission, engine, and/or rotor RPMs. In some cases, the active pumping/forcing mechanism can be integrated into the external fluid flow path. In this embodiment, the fluid flow path is not symmetric insofar as the direction of fluid entering and exiting the upper end cap 528 occurs generally normal to the central axis of the spindle 508 and fluid entering and exiting the lower end cap 530 occurs generally parallel and/or coaxial with the central axis of the spindle 508. These differing directions of fluid movement can result in a moment being generated. In some embodiments, the resultant moments may be selectively oriented to combat and/or add to other already existing moments of the helicopter 400. In other words, the non-symmetric fluid path can create a force imbalance that can be tailored to generate oscillatory moments for improved vibration reduction. The external port and/or primary fluid flow path being located externally also allows for longer flow path configurations where horizontal space is limited.

In operation of the LIVE systems 500, the introduction of a force into spindle 508 translates spindle 508 relative to the upper end cap 528 and the lower end cap 530. Such a displacement of spindle 508 and forces tuning fluid that is disposed within the primary and/or external fluid flow path to move through the upper external tube 532 and the lower external tube 534 in the opposite direction of the displacement of spindle 508. Such a movement of tuning fluid produces an inertial force that cancels, or isolates, the force from spindle 508. During typical operation, the force imparted on spindle 508 is oscillatory; therefore, the inertial force of tuning fluid is also oscillatory, the oscillation being at a discrete frequency, i.e., isolation frequency.

The isolation frequency ($f_i$) of LIVE systems 500 can be represented by the following equation:

$$f_i = \frac{1}{2\pi}\sqrt{\frac{K}{R(R-1)m_t}}$$

In the above equation, R represents the ratio of the functional area $A_p$ of spindle 508 to the total area $A_T$ inside the above-described primary and/or external fluid flow path or tuning passage. As such, $R=A_p/A_T$ Mass of tuning fluid is represented by $m_t$. The combined spring rate of elastomer members, for example the elastomer members of the journal bearings, is represented by K.

Figure 13:
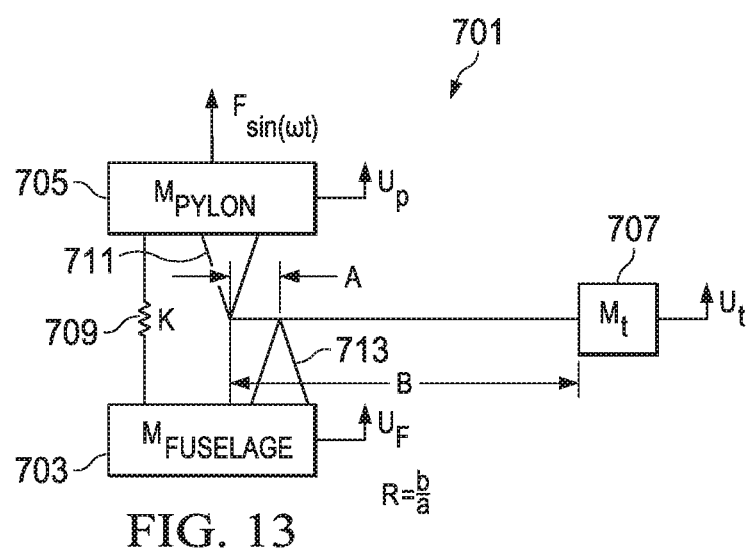
FIG. 13 is a mechanical equivalent force diagram of the LIVE systems of FIGS. 4-6

Referring briefly to FIG. 13 in the drawings, a mechanical equivalent model 701 for LIVE system 500 is illustrated. In mechanical equivalent model 701, a box 703 represents the mass of the fuselage $M_{fuselage}$; a box 705 represents the mass of the pylon assembly $M_{pylon}$; and a box 707 represents the mass of the tuning mass $m_t$, in this case, the mass of tuning fluid. A vibratory force $F \cdot \sin(\omega t)$ is generated by the transmission and propulsion system. Force $F \cdot \sin(\omega t)$ is a function of the frequency of vibration of the transmission and propulsion system.

Force $F \cdot \sin(\omega t)$ causes an oscillatory displacement $u_p$ of the pylon assembly; an oscillatory displacement of the fuselage $u_f$; and an oscillatory displacement of the tuning mass $u_t$. Elastomer members are schematically represented by a spring 709 disposed between the fuselage $M_{fuselage}$ and the pylon assembly $M_{pylon}$. Spring 709 has a spring constant K.

In mechanical equivalent model 701, tuning mass $M_t$ functions as if cantilevered from a first fulcrum 711 attached to the pylon assembly $M_{pylon}$, and a second fulcrum 713 attached to the fuselage $M_{fuselage}$. The distance A from first fulcrum 711 to second fulcrum 713 represents the cross-sectional area of the above-described primary and/or external tuning passage, and the distance B from first fulcrum 711 to the tuning mass $m_t$ represents the effective cross-sectional area of spindle 508, such that an area ratio, or hydraulic ratio, R is equal to the ratio of B to A. Mechanical equivalent model 701 leads to the following equation of motion for the system:

$$\begin{bmatrix} M_{pylon} + (R-1)^2 M_t & -R(R-1)M_t \\ -R(R-1)M_t & M_{fuselage} + R^2 M_t \end{bmatrix} \begin{Bmatrix} \ddot{u}_p \\ \ddot{u}_f \end{Bmatrix} + \begin{bmatrix} K & -K \\ -K & K \end{bmatrix} \begin{Bmatrix} u_p \\ u_f \end{Bmatrix} = \begin{Bmatrix} F\sin(\omega t) \\ 0 \end{Bmatrix}$$

As is evident, no means for actively tuning LIVE system 500 is available. Once the cross-sectional areas and length of the primary and/or external fluid flow path and spindle 508 are determined, and the tuning fluid density is finalized, the operation of LIVE system 500 is set. However, an embodiment of LIVE system 500 can be configured such that the isolation frequency can be selectively altered and optimized by the shortening and/or lengthening of the effective total length of the primary and/or external fluid flow path.

Figure 14:
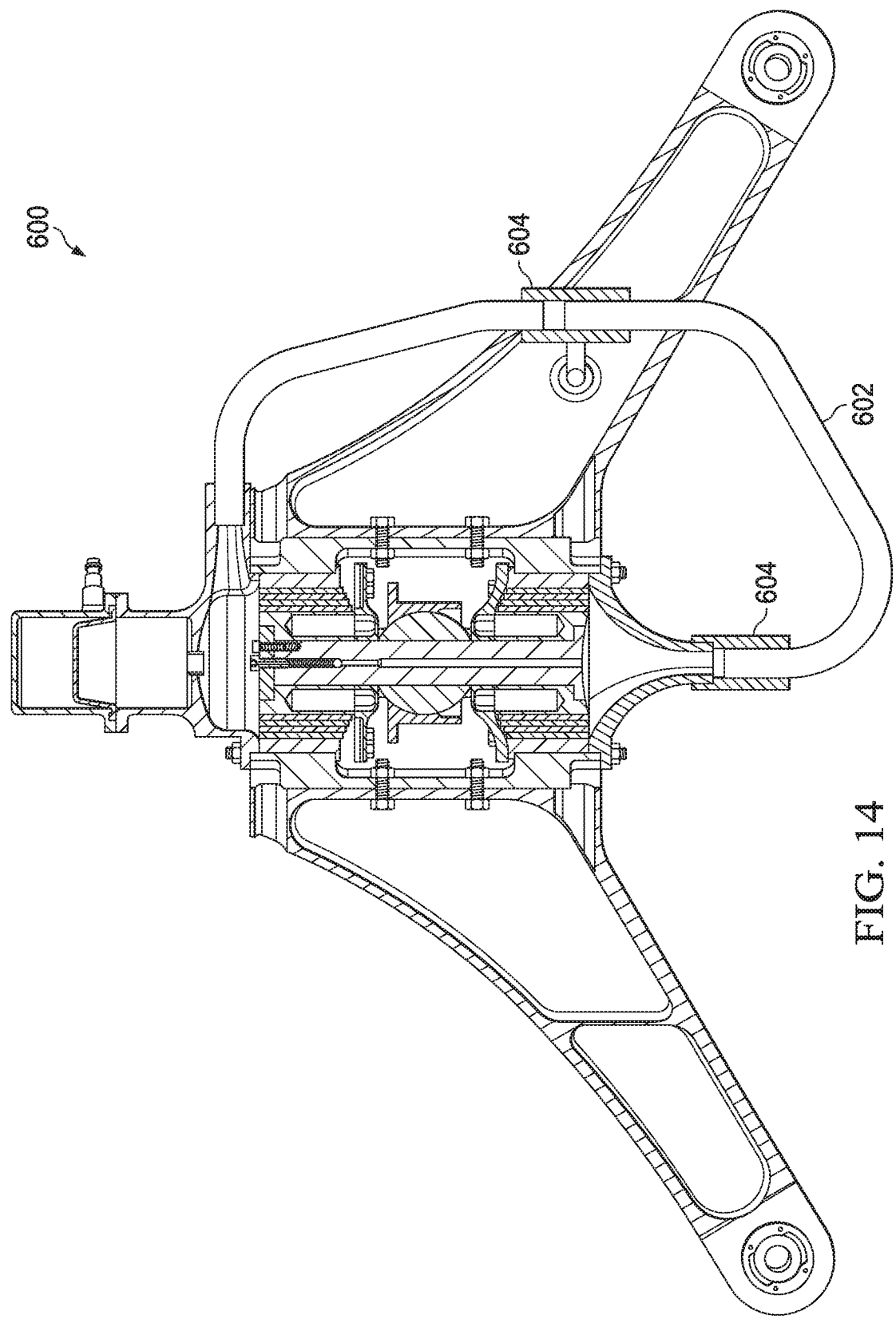
FIG. 14 is a cutaway side view of an alternative embodiment of a LIVE system comprising a trombone-type tunable external fluid flow path with the length of the external fluid flow path configured for a relatively short total length.
Figure 15:
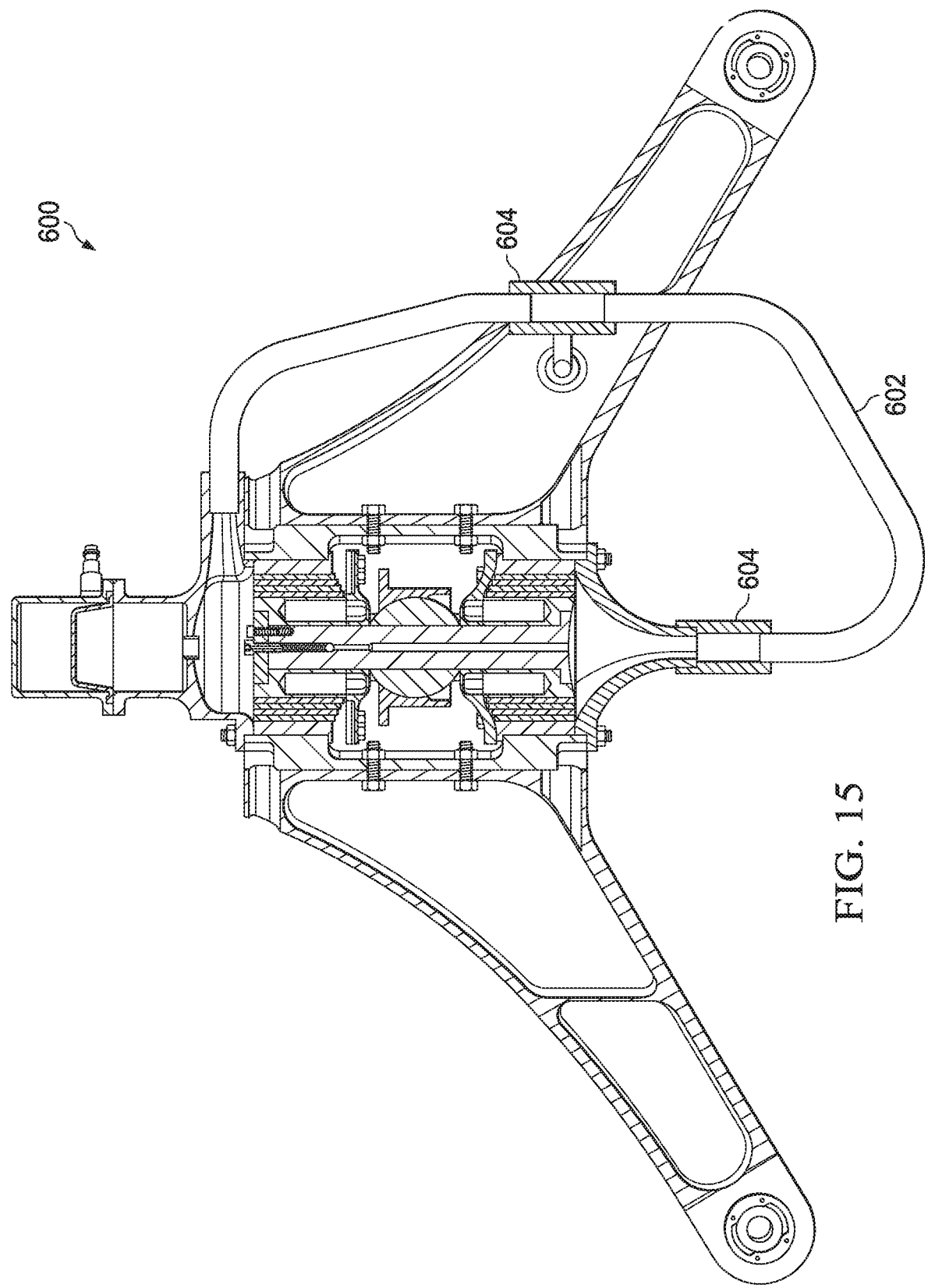
FIG. 15 is a cutaway side view of an alternative embodiment of a LIVE system comprising a trombone-type tunable external fluid flow path with the length of the external fluid flow path configured for a relatively long total length.

Referring now to FIGS. 14 and 15, an alternative embodiment of a LIVE system 600 is shown. The LIVE system 600 is substantially similar to the LIVE system 500 but comprises a trombone-type adjustable length external tube 602 received by two long couplings 604 that allow movement of the tube 602 along the length of the couplings 604. FIG. 14 shows the tube 602 located relative to the couplings 604 so that a relatively shorter overall external fluid flow path is provided. FIG. 15 shows the tube 602 located relative to the couplings 604 so that a relatively longer overall external fluid flow path is provided. By adjusting the location of the tube 602 relative to the couplings 604, the LIVE system 600 can be tuned to isolate different frequencies. In some embodiments, the movement of the tube 602 relative to the couplings 604 may be actively controlled and/or automated.

Figure 16:
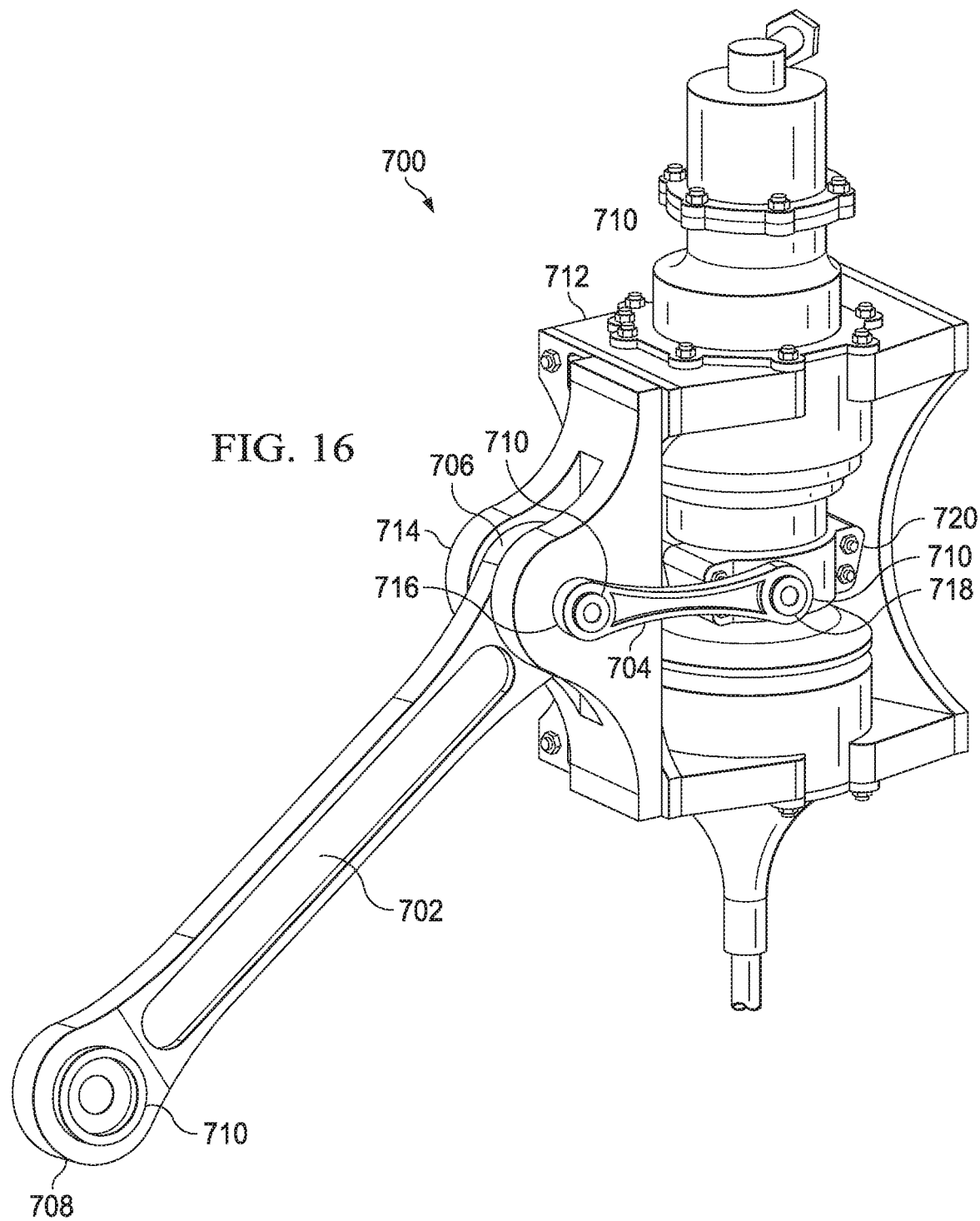
FIG. 16 is an oblique view of an alternative embodiment of a LIVE system comprising a removable leg and an idler link.

Referring now to FIG. 16, an alternative embodiment of a LIVE system 700 is shown. The LIVE system 700 is substantially similar to the LIVE system 500 but comprises removable legs 702 (only one shown) and idler links 704 (only one shown). The removable legs 704 comprise first connection portions 706 configured to receive a spherical bearing (hidden from view) a second connection portions 708 also configured to receive a spherical bearing 710. The removable legs 702 are connected to the central bearing housing 712 using a leg mount 714. The idler link 704 also comprises a first connection portion 716 and a second connection portion 718, each configured to receive a spherical bearing 710. The first connection portion 716 of the idler link 704 and the associated spherical bearing 710 are connected to the leg mount 714 which is connected to the central bearing housing 712. The second connection portion 718 of the idler link 704 and the associated spherical bearing 710 are connected to the bridge cap 720. Accordingly, the idler link 704 generally connects the leg mount 714 to the bridge cap 720 to prevent the central bearing housing 712 from rotating freely about an the axis of the interior spindle (not shown). It will be appreciated that the components to which the removable legs 702 and idler links 704 are attached to comprise additional necessary features such as, but not limited to, posts, bolts, pins, rods, and/or other intermediate structure, either removable or integral, to allow proper connection of the removable legs 702 and idler links 704.

While the LIVE systems 500, 600, 700 are described above as being utilized in a helicopter 400, the LIVE systems 500, 600, 700 can alternatively be utilized in any vehicle subject to large oscillatory forces at one discrete frequency, or a relatively narrow band of frequencies. For example, vehicles incorporating rotating machinery operating at one or more fixed speeds or speeds that vary across a relatively narrow range of speeds can utilize LIVE systems 500, 600, 700 to isolate vibration.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising an airframe;
a transmission; and a liquid inertia vibration elimination (LIVE) system disposed between the airframe and the transmission via spherical bearings of two legs and via a central spherical bearing;
wherein at least one of the two legs is removable and comprises spherical bearings at a first connection portion of the removable leg and a second connection portion of the removable leg.

2. The aircraft of claim 1, the LIVE system comprising:
an upper end cap;
a lower end cap;
a spindle located between the upper end cap and the lower end cap and comprising a secondary fluid flow path between the upper end cap and the lower end cap; and
an external tube connected between the upper end cap and the lower end cap, the external tube comprising a primary fluid flow path between the upper end cap and the lower end cap.

3. An aircraft, comprising:
a liquid inertia vibration elimination (LIVE) system, comprising:
  an upper end cap;
  a lower end cap;
  a spindle located between the upper end cap and the lower end cap, the spindle comprising a central bore therethrough that extends generally between the upper end cap and the lower end cap;
  an external adjustable length passage connected between the upper end cap and the lower end cap;
  a central spherical bearing configured to receive the spindle therethrough;
  a central bearing housing configured to secure the upper end cap relative to the lower end cap; and
  two legs connected to the central bearing housing;
  the central spherical bearing comprising:
    a spherical center portion comprising an upper tubular portion extending from the spherical center portion and a lower tubular portion extending from the spherical center portion;
    a central spherical bearing housing configured to receive the spherical center portion, the central spherical bearing housing comprising an inner spherical interface and a ledge; and
    a retaining cap configured to be received by the central spherical bearing housing, the retaining cap comprising a spherical interior profile;
    wherein the spherical center portion is configured to be captured within the central spherical bearing housing between the inner spherical interface of the central spherical bearing housing and the spherical interior profile of the retaining cap when the retaining cap is received by the central spherical bearing housing and substantially abuts the ledge of the central bearing housing.

4. The aircraft of claim 3, wherein the central spherical bearing is configured for attachment to a transmission via a bridge beam and complementary bridge cap.

5. The aircraft of claim 3, wherein each of the two legs further comprises a spherical bearing configured for connection to an airframe.

6. The aircraft of claim 5, wherein the central spherical bearing and the spherical bearings of the two legs are configured to provide pitch displacement compliance.

7. The aircraft of claim 3, further comprising:
an upper journal bearing carried by the central bearing housing; and
a lower journal bearing carried by the central bearing housing;
wherein the upper journal bearing and the lower journal bearing are configured to provide vertical displacement compliance.

8. The aircraft of claim 3, wherein when the spherical center portion is captured within the spherical bearing housing, elastomeric material can be disposed between the spherical center portion and the spherical bearing housing and elastomeric material is disposed between the spherical center portion and the retaining cap.

9. The aircraft of claim 3, wherein a length of the external tube is adjustable.

10. The aircraft of claim 3, wherein the external tube comprises a plurality of portions and wherein at least one of the portions is movable relative to another portion so that an overall fluid flow path via the external tube is adjustable.

11. An aircraft, comprising
an airframe;
a transmission;
a liquid inertia vibration elimination (LIVE) system disposed between the airframe and the transmission via spherical bearings of two legs and via a central spherical bearing; and
an idler link connected between at least one of the two legs and a central bearing housing that carries the central spherical bearing.

* * * * *